(12) United States Patent
Lim

(10) Patent No.: US 6,405,613 B1
(45) Date of Patent: Jun. 18, 2002

(54) CABLE SAVER MECHANISM

(75) Inventor: Puat Thiam Lim, Singapore (SG)

(73) Assignee: Shimano (Singapore) Pte. Ltd., Jurong Town (SG)

( * ) Notice: Subject to any disclaimer, the term of this patent is extended or adjusted under 35 U.S.C. 154(b) by 0 days.

(21) Appl. No.: 09/526,128

(22) Filed: Mar. 15, 2000

(51) Int. Cl.$^7$ ............................... F16C 1/10; F16C 1/22; F16H 9/00
(52) U.S. Cl. ................ 74/502.4; 74/502.6; 74/501.5 R; 474/80
(58) Field of Search .............................. 474/78, 80, 82, 474/69; 74/501.5 R, 502.4, 502.6, 500.5

(56) References Cited

U.S. PATENT DOCUMENTS

| | | | |
|---|---|---|---|
| 4,174,099 A | | 11/1979 | Yamasaki .................... 267/168 |
| 4,331,041 A | * | 5/1982 | Bennett .................. 74/501.5 R |
| 4,833,937 A | * | 5/1989 | Nagano .................. 74/501.5 R |
| 4,869,123 A | * | 9/1989 | Stocker .................. 74/501.5 R |
| 4,903,541 A | * | 2/1990 | Shiota .................... 74/501.5 R |
| 5,280,733 A | * | 1/1994 | Reasoner .................... 74/502.4 |
| 5,295,408 A | * | 3/1994 | Nagle et al. ............... 74/502.6 |
| 5,577,415 A | * | 11/1996 | Reasoner .................... 74/502.4 |
| 5,613,405 A | * | 3/1997 | Kelley et al. ............... 74/502.4 |
| 5,624,334 A | | 4/1997 | Lumpkin ...................... 474/79 |
| 5,746,094 A | * | 5/1998 | Medebach et al. .......... 74/502.4 |
| 5,765,446 A | * | 6/1998 | Patterson et al. ........... 74/502.4 |
| 5,921,143 A | * | 7/1999 | Castillo et al. ............. 74/502.4 |

FOREIGN PATENT DOCUMENTS

| | | |
|---|---|---|
| DE | 1605783 | 1/1971 |
| DE | 3300922 | 7/1984 |
| JP | 53128836 | 11/1978 |
| JP | 5433558 | 3/1979 |

* cited by examiner

*Primary Examiner*—David A. Bucci
*Assistant Examiner*—Marcus Charles
(74) *Attorney, Agent, or Firm*—Shinjyu Global IP Counselors, LLP

(57) ABSTRACT

A cable saver mechanism is provided in a cable of a cable operated component, such as a rear derailleur, to protect the cable operated component or a part of the bicycle when the bicycle falls over and the cable operated component, e.g., the rear derailleur, hits the ground. The cable saver mechanism has a first housing portion, a second housing portion and a biasing member disposed between the first and second housing portions to urge them apart from each other. The first housing portion has a first tubular section with a first end wall and first open end spaced from the first end wall. The first end wall includes a first cable bore with an internal section becoming wider towards the first open end. The second housing portion has a second tubular section with a second end wall and second open end spaced from the second end wall. The second end wall includes a second cable bore. The first and second open ends of the first and second housing portions are movably coupled together. The biasing member is disposed between the first and second end walls to urge the first and second housing portions apart from each other.

39 Claims, 5 Drawing Sheets

CABLE SAVER MECHANISM

BACKGROUND OF THE INVENTION

1. Field of the Invention

This invention generally relates to a cable saver mechanism for a cable operated device of a bicycle. More specifically, the present invention relates a cable saver mechanism that protects a cable operated device or a part of the bicycle when the bicycle falls over and the cable operated device hits the ground or otherwise causes tension within the cable.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Most of today's bicycles are multi-speed bicycles that allow the rider to select the appropriate gear ratio to suit the particular riding conditions encountered during the bicycle ride. One of the most popular types of gearing assemblies for multi-speed bicycles utilize a chain extending between a set of front sprockets mounted for rotation with the pedals and a set of rear sprockets mounted on the rear hub of the rear bicycle wheel for rotation therewith. Two derailleurs are typically used to move the chain between the sprockets or gears. Generally, most derailleurs (front or rear derailleurs) include a fixed or base member secured to a bicycle frame, and a movable member with a chain guide that is supported for movement relative to the fixed or base member by a linkage assembly. The chain guide has a pair of guide plates that form a chain receiving slot for contacting and moving a chain between the sprockets.

The derailleurs as well as other cable operated components for such multi-speed bicycles, are constantly being redesigned to operate more efficiently and to improve the design such that they can be made lighter. Accordingly, rear derailleurs are typically constructed of lightweight materials and are made as thin as possible. Of course, this can make the rear derailleur more fragile, and thus, more prone to being damaged should the bicycle hit the ground. One problem that sometimes occurs with certain rear derailleurs is that when the bicycle falls over, the rear derailleur sometimes hits the ground first causing tensioning of the control cable. This is especially the case in a low normal type of rear derailleur, and when the derailleur is at a rear top position. When the derailleur hits the ground, the ground forces the derailleur to move inwardly towards the low gears. This movement of the derailleur causes the gear shifting cable to stretch. If the rear derailleur does not "give way" the tension of the gear shifting cable generated from the impact of the fall is so great that it would damage either the rear derailleur or the drop-out of the bicycle. Moreover, the rear derailleur and the shift cable may be damaged such that poor gear shifting performance occurs in the future. The cable saver mechanism absorbs the tension of the gear shifting cable that is generated from the impact of the rear derailleur with the ground. Hence, no damage is done to the rear derailleur or the drop-out of the bicycle.

In view of the above, there exists a need for a cable saver mechanism which overcomes the above mentioned problems in the prior art. This invention addresses this need in the prior art as well as other needs, which will become apparent to those skilled in the art from this disclosure.

SUMMARY OF THE INVENTION

One object of the present invention is to provide a cable saver mechanism that protects a cable operated component by absorbing a shock to the bicycle component.

Another object of the present invention is to provide a cable saver mechanism that is relatively simple in construction.

The foregoing objects can basically be attained by providing a cable saver mechanism in a cable of a bicycle component to protect the bicycle component or a part of the bicycle when the bicycle falls over and hits the ground. The cable saver mechanism has a first housing portion, a second housing portion and a biasing member disposed between the first and second housing portions to urge them apart from each other. The first housing portion has a first tubular section with a first end wall and first open end spaced from the first end wall. The first end wall includes a first cable bore with an internal section becoming wider towards the first open end. The second housing portion has a second tubular section with a second end wall and second open end spaced from the second end wall. The second end wall includes a second cable bore. The first and second open ends of the first and second housing portions are movably coupled together. The biasing member is disposed between the first and second end walls to urge the first and second housing portions apart from each other.

The foregoing objects can basically be attained by providing a cable saver mechanism in a cable of a bicycle component to protect the bicycle component or a part of the bicycle when the bicycle falls over and hits the ground. The cable saver mechanism has a first housing portion, a second housing portion and a biasing member disposed between the first and second housing portions to urge them apart from each other. The first housing portion has a first tubular section with a first end wall and first open end spaced from the first end wall. The first end wall includes a first cable bore. The first housing portion includes at least one water drainage bore. The second housing portion has a second tubular section with a second end wall and second open end spaced from the second end wall. The second end wall includes a second cable bore. The first and second open ends of the first and second housing portions are movably coupled together. The biasing member is disposed between the first and second end walls to urge the first and second housing portions apart from each other.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
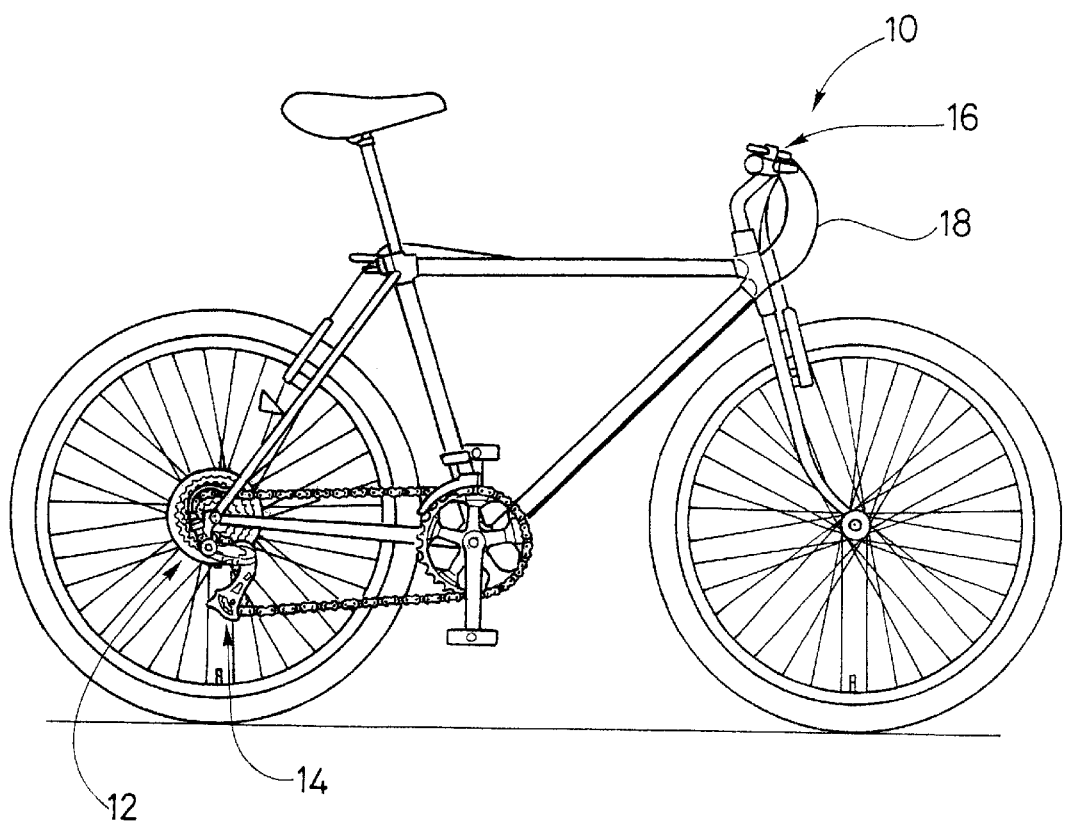
FIG. 1 is a side elevational view of a conventional bicycle with a cable saver mechanism in accordance with the present invention installed on the rear derailleur.

Referring initially to FIG. 1, a bicycle 10 is illustrated with a cable saver mechanism 12 installed on a rear derailleur in accordance with the present invention as discussed below. Bicycle 10 and its various components are well known in the prior art, except that the cable saver mechanism 12 has been installed on a rear derailleur 14 in accordance with the present invention. Thus, bicycle 10 and its various components will not be discussed or illustrated in detail herein, except for the components that relate to the present invention.

As used herein, the following directional terms "forward, rearward, upward, above, downward, vertical, horizontal, below and transverse" as well as any other similar directional terms refer to those directions of a bicycle in its normal riding position, which derailleur 14 is attached. Accordingly, these terms, as utilized to describe the cable saver mechanism 12 or the derailleur 14 in the claims, should be interpreted relative to bicycle 10 in its normal riding position.

Referring initially to FIG. 1, a conventional bicycle 10 is illustrated with various bicycle components. Bicycles and their various components are well known in the art, and thus, bicycle 10 and its various components will not be discussed or illustrated in detail herein except for the components that relate to the present invention. In other words, only derailleur 14 will be briefly discussed and/or illustrated herein as they relate to the present invention. Many of these bicycle components are operated by levers or operating devices coupled thereto via cables. The rear derailleur 14 is operated by a shifting unit 16 via a shift cable 18 in a conventional manner.

The shift cable 18 is a conventional cable that has an outer casing 20 and an inner wire 22. The cable saver mechanism 12 is coupled between one end of the outer casing 20 and the rear derailleur 14. The inner wire 22 extends through the cable saver mechanism 12, as discussed below.

Figure 2:
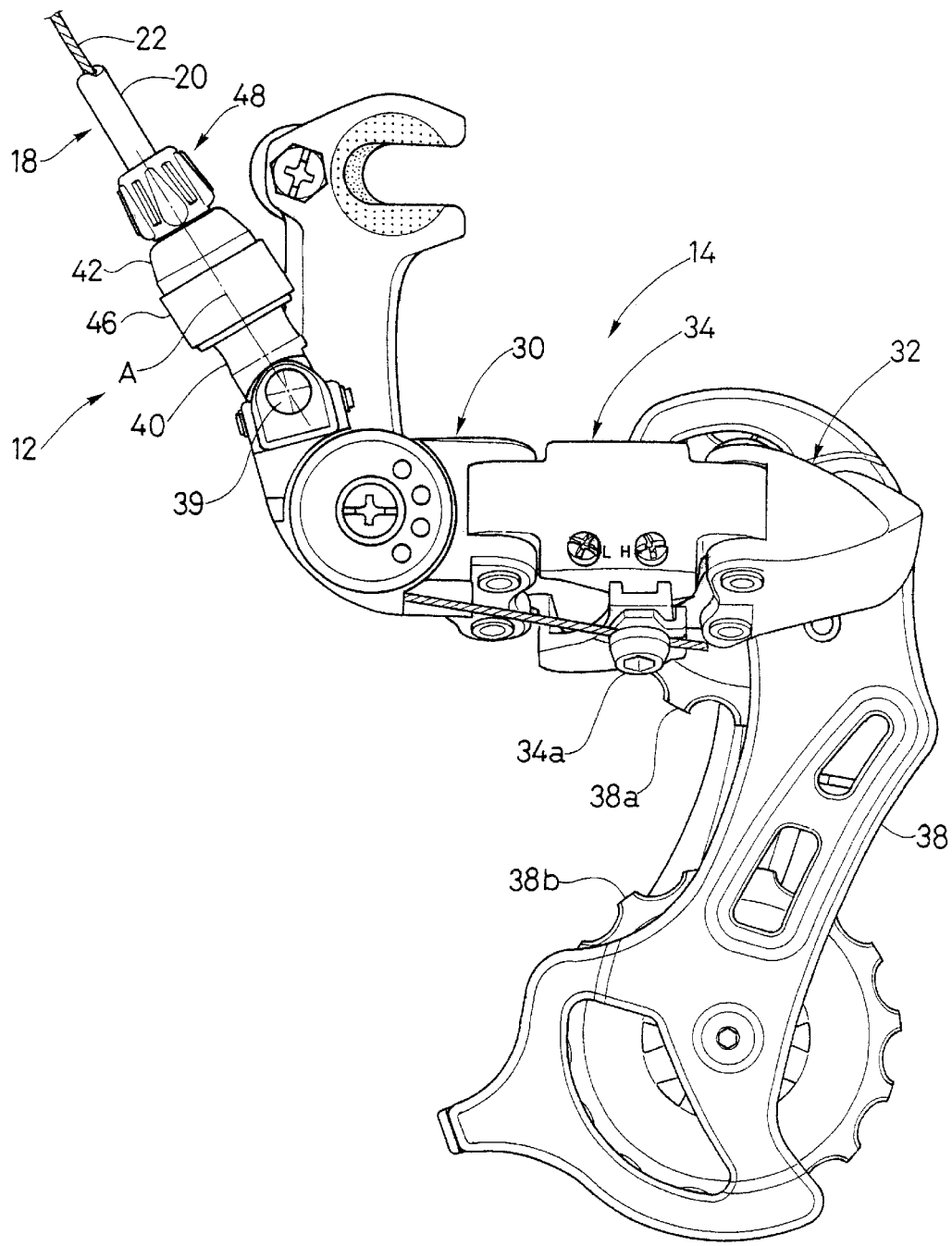
FIG. 2 is an enlarged side elevational view of the rear derailleur with the cable saver mechanism installed thereon in accordance with the present invention.
Figure 3:
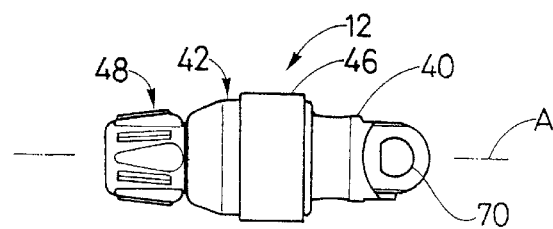
FIG. 3 is a side elevational view of the cable saver mechanism illustrated in FIG. 2 in accordance with the present invention.

As best seen in FIGS. 2 and 3, rear derailleur 14 is a low normal type derailleur that is normally biased to the low or large gear of the rear set of gears of bicycle 10. Derailleur 14 can be a relatively conventional low normal type derailleur. Thus, rear derailleur 14 will not be discussed or illustrated in detail herein. Rather, rear derailleur 14 will only be briefly discussed in order to understand the use of cable saver mechanism 12 therewith.

Basically, rear derailleur 14 has a base or fixed member 30, a movable member 32, a linkage assembly 34 and a biasing member or spring (not shown). The fixed member 30 is coupled to the frame of the bicycle 10 via a conventional bracket axle assembly (not shown). The biasing member or spring is located between the fixed member 30 and the movable member 32 for urging the movable member 32 to a low gear position. The linkage assembly 34 has a cable fixing bolt 34a for securing the end of the inner wire 22 thereto. The movable member 32 has a cage 38 pivotally coupled thereto and biased to place the chain of bicycle 10 under tension. The cage 38 has a guide pulley 38a and a tension pulley 38b rotatably coupled thereto. Preferably, each of the parts of rear derailleur 14 is constructed of relatively lightweight, rigid materials which are well known in the art.

Figure 7:
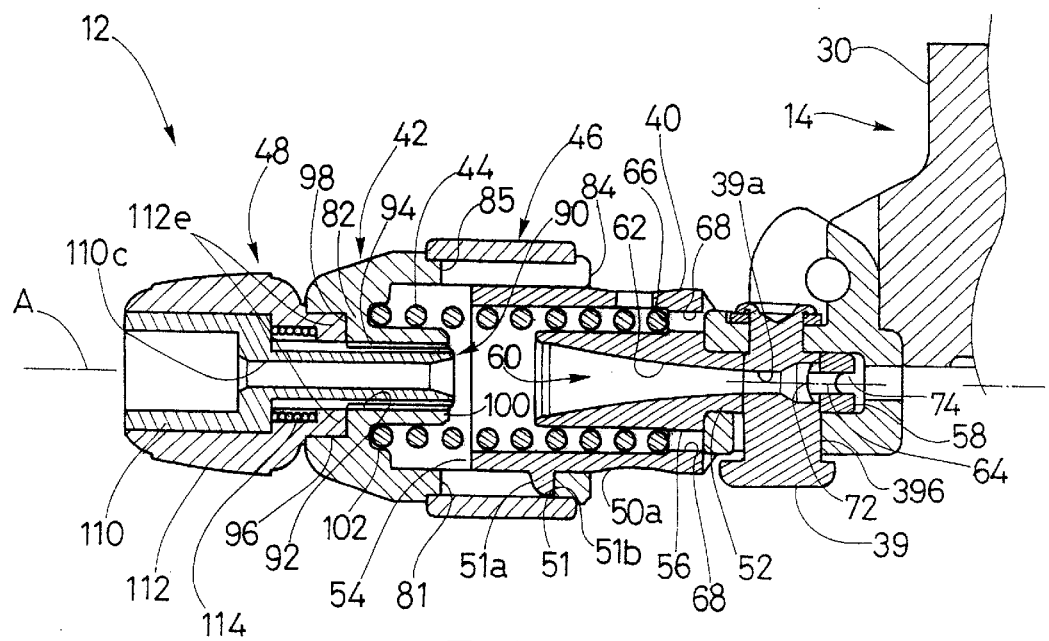
FIG. 7 is a longitudinal cross sectional view of the cable saver mechanism illustrated in FIGS. 2–6 installed on the rear derailleur prior to compression.
Figure 8:
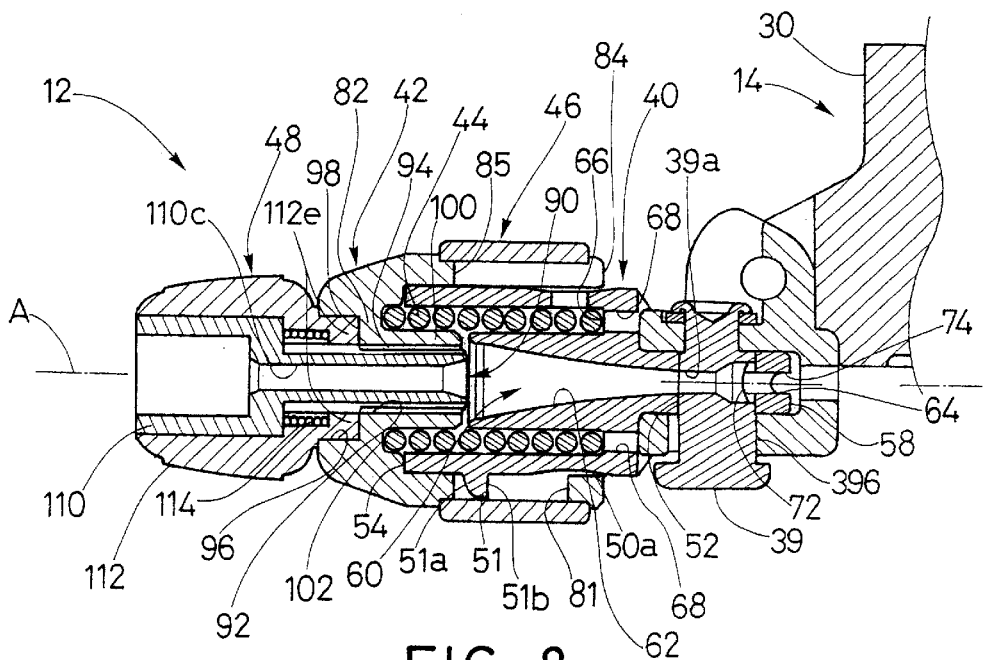
FIG. 8 is a longitudinal cross sectional view of the cable saver mechanism illustrated in FIGS. 2–7 installed on the rear derailleur after compression.
Figure 9:
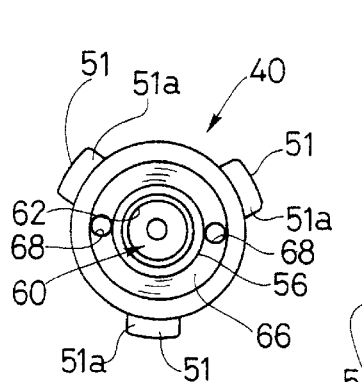
FIG. 9 is a left end elevational view of the first housing of the cable saver mechanism illustrated in FIGS. 2–7 in accordance with the present invention.
Figure 10:
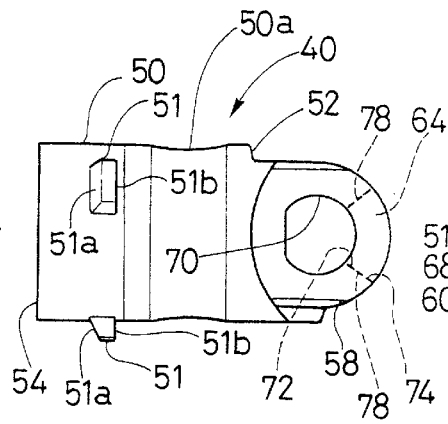
FIG. 10 is a side elevational view of the first housing of the cable saver mechanism illustrated in FIGS. 2–7 in accordance with the present invention.
Figure 11:
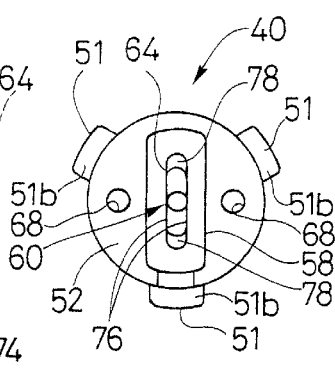
FIG. 11 is a right end elevational view of the first housing of the cable saver mechanism illustrated in FIGS. 2–7 in accordance with the present invention.

As seen in FIGS. 2, 7 and 8, the cable saver mechanism 12 is provided between the cable 18 and the fixed member 30 of the rear derailleur 14. In particular, a fastener 39, such as a rivet or the like, pivotally couples the cable saver mechanism 12 to the fixed member 30 of the rear derailleur 14. Preferably, the fastener 39 is non-rotatably coupled to the cable saver mechanism 12, and has a transverse bore 39a extending substantially perpendicularly through the shaft 39b of the fastener 39 for receiving the inner wire 22 therethrough. The shaft 39b of the fastener 39 is non-circular in cross section, e.g., a flat portion, to prevent relative rotation between the cable saver mechanism 12 and the fastener 39. This ensures that the orientation of the bore 39a remains properly aligned with the cable saver mechanism 12.

The cable saver mechanism 12 is operatively coupled to cable 18 to protect the rear derailleur 14 or the drop-out of the bicycle 10 when the bicycle 10 falls over and the rear derailleur 14 hits the ground. In other words, when bicycle 10 falls on the side where the rear derailleur 14 is located, there is a possibility that the rear derailleur 14 will hit the ground first. This is especially the case in a low normal type of rear derailleur, and when the derailleur is at a rear top position. When the derailleur 14 hits the ground, the ground forces the derailleur 14 to move inwardly towards the low gears. This movement of the derailleur 14 causes the gear shifting cable 18 to stretch. If the rear derailleur 14 does not "give way" due to the tension in the gear shifting cable 18 that is generated from the impact of the fall, either the rear derailleur or the drop-out of the bicycle will be damaged. Moreover, the rear derailleur 14 and the shift cable 18 may be damaged such that poor gear shifting performance occurs in the fixture. The cable saver mechanism 12 absorbs the tension of the gear shifting cable 18 that is generated from the impact of the rear derailleur 14 with the ground. Hence, no damage is done to the rear derailleur 14 or the drop-out of the bicycle 10.

As best seen in FIGS. 3–6, the cable saver mechanism 12 basically includes a first housing portion 40, a second housing portion 42, a biasing member 44 and a sleeve 46. The biasing member 44 is disposed between the first and second housing portions 40 and 42 to urge them apart from each other. A cable adjusting mechanism 48 is also coupled to the second housing portion 42 for adjusting the relative tension between the outer casing 20 and the inner wire 22. The first and second housing portions 40 and 42 are telescopically coupled together with the biasing member 44 disposed between the first and second housing portions 40 and 42 to urge them apart from each other as seen in FIGS. 7 and 8.

As best seen in FIGS. 7–11, the first housing portion 40 is preferably molded as a one-piece unitary member from a rigid, lightweight material such as a relatively hard or stiff plastic. The first housing portion 40 has a first tubular section or wall 50 with a first end wall 52 and first open end 54 spaced from the first end wall 52.

The internal surface of first tubular section 50 defines a cylindrical cavity for receiving one end of the biasing member 44 therein. The external surface of the first tubular section or wall 50 has a recessed surface 50a and three protrusions 51 extending outwardly therefrom in a radial direction. The recessed surface 50a extends circumferentially around the first tubular section 50. The recessed surface 50 aids in the assembly of the sleeve 46 onto the first and second housing portions 40 and 42 as explained below. Preferably, the recessed surface 50a is curved in the longitudinal direction of the first housing portion 40.

Preferably, the protrusions 51 are equally spaced about the circumference of the first tubular section 50, i.e., approximately 120° apart. These protrusions 51 engage the second housing portions 42 to couple the first and second housing portions 40 and 42 together. These protrusions 51 also cooperate with the second housing portion 42 to allow sliding movement between the first and second housing portions 40 and 42. Each of the protrusions 51 has an inclined surface 51a and an abutment surface 51b. The inclined surfaces 51a of the protrusions 51 are inclined to form an angle with the center longitudinal axis A of the cable saver mechanism 12. The abutment surfaces 51b lie in a plane that is substantially perpendicular to the longitudinal axis A of the cable saver mechanism 12.

As best seen in FIGS. 7 and 8, the first end wall 52 has an internal annular wall section 56 and an outer mounting section 58 with a first cable bore 60 extending therethrough. The first cable bore 60 has two sections. A first or internal section 62 of the first cable bore 60 is formed within the internal annular wall section 56. A second or external section 64 is formed within the outer mounting section 58.

The internal annular wall section 56 is concentrically arranged within the first tubular section 50. An inner abutment surface 66 is formed on the first end wall 52 and extends radially between the first tubular section 50 and the inner annular wall sections 56. The inner abutment surface 66 faces in an axial direction towards the first open end 54 of the first housing portion 40. The inner abutment surface 66 engages one end of the biasing member 44.

Two water drainage bores 68 are formed in the inner abutment surface 66 of the first housing 40. Of course, the water drainage bores 68 can be formed in the second housing 42. In other words, at least one of the first and second housings 40 and 42 has at least one water drainage bore formed therein. In the illustrated embodiment, two water drainage bores are formed in the first housing portion 40, but of course, fewer or more water drainage bores can be formed therein. Moreover, while the water drainage bores 68 are formed in the first end wall of the first housing portion 40, it is possible to locate the water drainage bores else where in the first housing portion 40. Preferably, the water drainage bores 68 are arranged along an imaginary circle on the inner abutment surface 66 of first end wall 52 with the water drainage bores 68 being equally spaced apart.

The outer mounting section 58 includes a mounting hole 70 extending substantially perpendicular to the first cable bore 60 and located between the internal and external sections 62 and 64 of the first cable bore 60. The mounting hole 70 is preferably a non-circular hole to mate with the shaft 39b of fastener 39 to prevent relative rotation therebetween. The outer mounting section 58 forms the external section 64 of the first cable bore 60 that is substantially axial aligned with the internal section 62 of the first cable bore 60.

The internal section 62 is trumpet-shaped or funnel-shaped such that the first cable bore 60 becomes wider towards the first open end 54. This funnel-shape of the internal section 62 of first cable bore 60 allows for easy threading of the inner wire 22 through first housing portion 40, as explained below in more detail.

More specifically, the internal section 62 of the first cable bore 60 has a first width adjacent the first end wall 52 and a second width adjacent the first open end 54. The second width of the first cable bore 60 is preferably at least twice the first width of the first cable bore 60, which is equal to or slightly larger than the diameter of the inner wire 22. More preferably, second width of the first cable bore 60 is preferably approximately three times the first width of the first cable bore 60.

As best seen in FIGS. 5, 6, 10 and 11, the external section 64 of the first cable bore 60 has a first end 72 adjacent the internal section 62 and a second end 74 remote from the internal section 62. The external section 64 of the first cable bore 60 is fan-shaped. In particular, the external section 64 of the first cable bore 60 has a pair of substantially flat fan-shaped surfaces 76 spaced apart from each other and connected at their diverging ends by a pair of curved surfaces 78. The external section 64 having a first width in a first direction extending between the curved surfaces 78, which becomes wider from the first end of the external section 64 to the second end of the external section 64. The external section 64 has a second width in a second direction extending between the flat fan-shaped surfaces 76 that is perpendicular to the first direction of the first width of the external section 64. This second width of the external section 64 is defined by the pair of substantially parallel flat fan-shaped surfaces 76 that are spaced apart by a distance substantially equal to the first width of the internal section 62 adjacent the first end wall 52.

As best seen in FIGS. 7, 8, and 12–14, the second housing portion 42 is preferably molded as a one-piece, unitary member from a rigid, lightweight material, such as a relatively hard or stiff plastic. The second housing portion 42 has a second tubular section or wall 80 with a second end wall 82 and a second open end 84 spaced from the second end wall 82. The second tubular section 80 is telescopically coupled to the first tubular section 50 so that the first and second housing portions 40 and 42 can move together and compress the biasing member 44.

More specifically, the second tubular section 80 is provided with three slots 81 that extend in a longitudinal direction. The slots 81 receive the projections 51 of the first tubular section 50 since the projections 51 have inclined surfaces 51a. The first and second housing portion 40 and 42 can be coupled together via a snap-fit by axially pushing the first and second housing portion 40 and 42 together. Although, the second housing portion 42 is formed of a substantially rigid material, the second housing portion 42 has a slight resiliency due to three longitudinal slits 85. Thus, the second tubular section 80 can expand radially outwardly over the projections 51 and spring back, such that the projections 51 are substantially permanently received in the slots 81.

Figure 5:
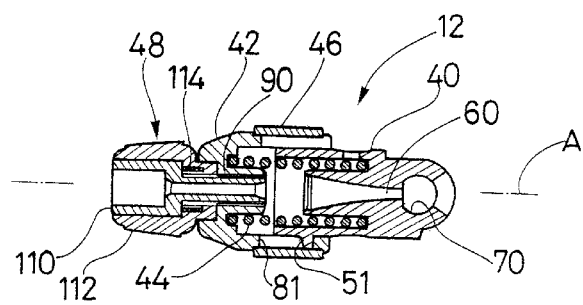
FIG. 5 is a longitudinal cross sectional view of the cable saver mechanism illustrated in FIGS. 2–4 in accordance with the present invention.

Once the projections 51 are located in the slots 81, it will be very difficult to separate the first and second housing portions 40 and 42, since the protrusions 51 have flat abutment surfaces 51*b* that resists the separation of the first and second housing portions 40 and 42. In the normal rest position, as seen in FIGS. 5 and 7, the abutment surfaces 51*b* of the protrusions 51 engage the ends of the slots closest to the second open end of the second housing portion 42 due to the urging force of the biasing member 44. In other words, when the first and second housing portions 40 and 42 are coupled together, the biasing member 44 is pre-loaded to be under compression.

As explained below, the biasing member 44 should not compress during normal use of the derailleur 14 by the shifting unit 16. In other words, the urging or biasing force of the biasing member 44 should be greater than the force necessary to move the derailleur 14 between its various shirting positions.

The second tubular section 80 also has an annular recess 86 located around the portion containing the slots 81. This recess 86 is designed for receiving the sleeve 46 therein. In other words, the sleeve 46 overlies the slots 81 to minimize dirt or other contaminants from entering the cable saver mechanisms 12 through the slots 81. This annular recess 86 forms a pair of annular abutment surfaces 86*a* and 86*b* that are axially spaced in part from each other by a distance substantially equal to the longitudinal length of the sleeve 46. After the first and second housings 40 and 42 are coupled together, the sleeve 46 is inserted over the first housing 40 and then over the open end 84 of the second housing 42 and into the annular recess 86. The sleeve 46 further ensures that the first and second housings 40 and 42 do not separate from each other.

Figure 12:
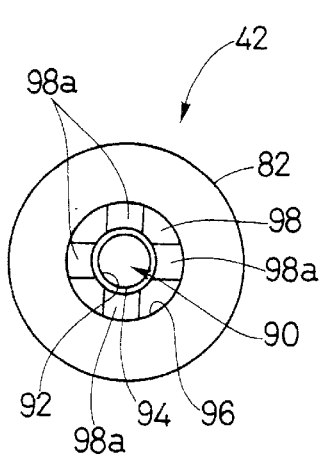
FIG. 12 is a left end elevational view of the second housing of the cable saver mechanism illustrated in FIGS. 2–7 in accordance with the present invention.
Figure 13:
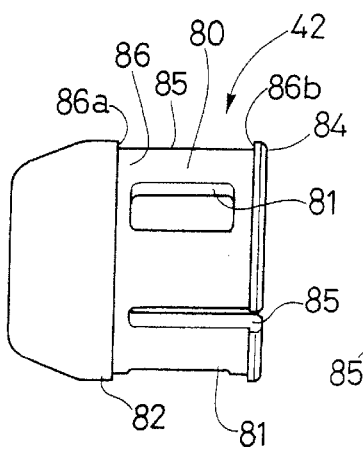
FIG. 13 is a side elevational view of the second housing of the cable saver mechanism illustrated in FIGS. 2–7 in accordance with the present invention.
Figure 14:
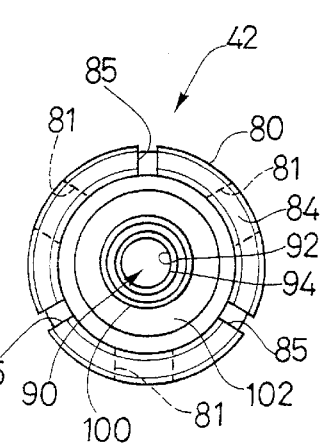
FIG. 14 is a right end elevational view of the second housing of the cable saver mechanism illustrated in FIGS. 2–7 in accordance with the present invention.

The second end wall 82 includes a second cable bore 90. The second cable bore 90 is preferably step-shaped with a first or inner cylindrical section 92 having a threaded sleeve insert 94 and a second or outer cylindrical section 96. The second cylindrical section 96 of the second cable bore 90 has a larger diameter and is provided with a contoured abutment surface 98 that extends radially between the first and second cylindrical sections 92 and 96 of the second cable bore 90. This contoured abutment surface 98 preferably has four recesses 98*a* that are spaced approximately 90° apart as seen in FIG. 12. These recesses 98*a* are preferably curved such that their curvature has a center axis that intersects with the center longitudinal axis A of the cable saver mechanism 12. These recesses 98*a* of the abutment surface 98 cooperate with the cable adjusting mechanism 48, as explained below.

The second end wall 82 has an internal annular wall section 100 that is concentrically arranged with the second tubular section 80. An abutment surface 102 is formed between the second tubular section 80 and the internal annular wall section 100. This abutment surface 102 faces in an axial direction towards the second open end 84 of the second housing portion 42 for engaging an end of the biasing member 44.

The biasing member 44 is preferably a coil compression spring located concentrically around the inner or internal annular wall sections. The biasing member 44 is disposed between the first and second end walls to urge the first and second housing portions 40 and 42 apart from each other. When the first and second housing portions 40 and 42 are coupled together, the biasing member 44 is pre-loaded to be under compression. The biasing or urging force of the biasing member 44 should be sufficiently larger such that the biasing member 44 does not compress during normal use of the derailleur 14 by the shifting unit 16. In other words, the urging or biasing force of the biasing member 44 should be greater than the force necessary to move the derailleur 14 between its various shirting positions.

The sleeve 46 is a tubular member that is preferably molded as a one-piece, unitary member from a rigid, lightweight material such as a relatively hard plastic. The sleeve 46 is coaxially mounted around the first and second housing portions 40 and 42 to prevent separation of the first and second housing portions 40 and 42. When the sleeve 42 is inserted over the first and second housing portions 40 and 42, the free ends of the second housing portion 42 are deflected inwardly into recessed surface 50*a*. This allows the sleeve 42 to be easily inserted into the annular recess 86 of the second housing portion 42. In particular, the sleeve 46 is located in the annular recess 86 of the second housing 42 between the abutment surfaces 86*a* and 86*b*. The sleeve 46 further ensures that the first and second housings 40 and 42 do not separate from each other. Moreover, the sleeve 46 covers the slots 81 of the second tubular section 80.

Figure 4:
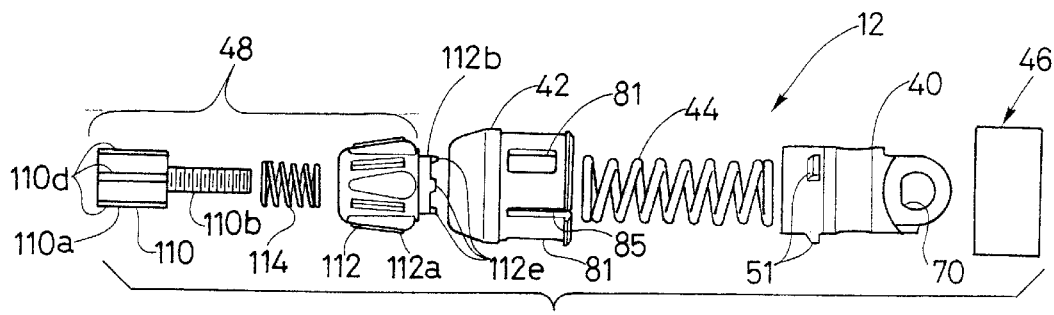
FIG. 4 is an exploded side elevational view of the cable saver mechanism illustrated in FIGS. 2 and 3 in accordance with the present invention.
Figure 6:
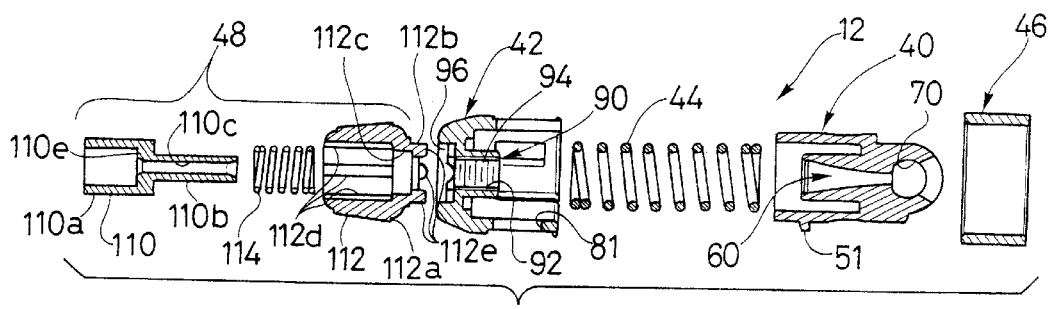
FIG. 6 is an exploded longitudinal cross sectional view of the cable saver mechanism illustrated in FIGS. 2–5 in accordance with the present invention.

As best seen in FIGS. 4–6, the cable adjusting mechanism 48 has a cable adjusting bolt 110, a cable adjusting barrel 112 and a biasing element 114. The cable adjusting mechanism 48 is a relatively conventional device that is often installed directed on cable operated components such as the derailleur 14. The cable adjusting mechanism 48 engages the outer casing 24 of the cable 18 for changing its relative position in relationship to the inner wire 22.

The cable adjusting bolt 110 is preferably constructed as a one-piece, unitary member, such as metallic material. The cable adjusting bolt 110 has a head portion 110*a* and a shaft portion 110*b* with an axially extending bore 110*c* extending through both the head portion 110*a* and the shaft portion 110*b*. The bore 110*c* is step-shaped, as explained below. The head portion 110*a* is a tubular member with a non-circular outer surface (cylindrical surface with four longitudinally extending ribs 110*d*) and a cylindrical inner surface with an abutment surface 110*e* formed at the intersection between the head portion 110*a* and the shaft portion 110*c*.

The shaft portion 110*b* has a threaded outer surface and a cylindrical inner surface. The threads of the outer surface are designed to be threadedly engaged with the internal threads of the sleeve insert 94 located in the second cable bore 90. Accordingly, rotation of the cable adjusting bolt 110 causes the cable adjusting bolt 112 to move axially relative to the housing portions 40 and 42 of the cable saver mechanism 12. The inner diameter of the bore 110*c* along the shaft portion 110*c* is preferably sized to be equal to or slightly larger than the diameter of the inner wire 22. The inner end of the bore 110*c* can be provided with a conical end section as seen in FIGS. 7 and 8.

As best seen in FIGS. 4–6, the cable adjusting barrel 112 is preferably constructed as a one-piece, unitary member that is molded from a rigid lightweight material, such as a relatively hard plastic material. The cable adjusting barrel 112 has a gripping section 112*a* and a retaining section 112*b* with a step-shaped bore 112*c* extending therethrough. The gripping section has a non-circular outer surface that allows a user to easily turn the cable adjusting barrel 112. The bore 112c along the gripping section 112a is preferably non-circular in cross-section (four longitudinally extending grooves 112d) and corresponds to the external surface of the head portion 110a of the cable adjusting bolt 110. Thus, rotation of the gripping section 112a causes rotation of the cable adjusting bolt 110.

The retaining section 112b has an outer cylindrical surface that is substantially equal to or slightly smaller than the cylindrical section 96 of the second cable bore 90 so as to rotate therein. The free end of the retaining section 112b preferably has four detents or protrusions 112e extending axially therefrom. These protrusions 112e are preferably spaced 90° apart such that they engage the recesses 98a of the second housing portion 42. In other words, these recesses 98a cooperate with the protrusions 112e to maintain the cable adjusting bolt 110 and the cable adjusting barrel 112 in a selected position. More specifically, the biasing element 114 is located around the shaft portion 110b and between the head portion 110a and the cable adjusting barrel 112 to apply an axial force therebetween. Since the cable adjusting bolt 110 is adjustably fixed to the second housing portion 42, the cable adjusting barrel 112 is biased against the second housing portion 42.

The detents or protrusions 112e of the cable adjusting barrel 112 form a first mating surface, while the recesses 98a of the second housing portion 42 form a second mating surface with the first and second mating surfaces being urged together by the biasing element 114. The first mating surface with the detents or protrusions 112e and the second mating surface with the recesses 98a are configured to cooperate with each other to prevent relative rotational movement between the cable adjusting mechanism 48 and the second housing portion 42 until a rotational force is applied therebetween that overrides the urging force from the biasing element 114, which causes relative axial movement between the cable adjusting mechanism 48 and the second housing portion 42.

While only one embodiment has been chosen to illustrate the present invention, it will be apparent to those skilled in the art from this disclosure that various changes and modifications can be made herein without departing from the scope of the invention as defined in the appended claims. For example, the cable saver mechanism can be installed in the middle of the cable and/or used with the cable operated components. Furthermore, the foregoing description of the embodiments according to the present invention are provided for illustration only, and not for the purpose of limiting the invention as defined by the appended claims and their equivalents.

What is claimed is:

1. A cable saver mechanism comprising:
   a first housing portion having a first tubular section with a first end wall and first open end spaced from said first end wall, said first end wall including a first cable bore with an internal section becoming wider towards said first open end;
   a second housing portion having a second tubular section with a second end wall and second open end spaced from said second end wall, said second end wall including a second cable bore with a longitudinal axis, said first and second open ends of said first and second housing portions being movably coupled together to move between an extended position and a retracted position;
   a biasing member disposed between said first and second end walls to urge said first and second housing portions apart from each other toward said extended position such that said first and second housing portions move freely toward said retracted position upon application of a force larger than an urging force of said biasing member on at least one of said first and second housing portions; and
   a cable adjusting mechanism adjustably coupled in said second cable bore of said second housing portion to be longitudinally adjusted relative to said longitudinal axis of said second housing.

2. A cable saver mechanism according to claim 1, wherein said internal section of said first cable bore has a first width adjacent said first end wall and a second width adjacent said first open end, said second width being at least twice said first width.

3. A cable saver mechanism according to claim 1, wherein said first end wall includes an inner abutment surface and an inner annular wall section extending from said inner abutment surface towards said first open end.

4. A cable saver mechanism according to claim 3, wherein said inner annular wall section is concentrically arranged within said first tubular section with said inner abutment surface extending radially therebetween.

5. A cable saver mechanism according to claim 4, wherein said biasing member is a coil spring located concentrically around said inner annular wall section.

6. A cable saver mechanism according to claim 1, wherein said first end wall has an outer mounting section forming a portion of said first cable bore.

7. A cable saver mechanism according to claim 6, wherein said outer mounting section includes a mounting hole extending substantially perpendicular to said first cable bore.

8. A cable saver mechanism according to claim 6, wherein said outer mounting section forms an external section of said first cable bore that is substantially axial aligned with said internal section of said first cable bore.

9. A cable saver mechanism according to claim 1, wherein said second housing portion has a recess that receives a portion of said cable adjusting mechanism therein.

10. A cable saver mechanism according to claim 1, wherein one of said first and second housing portions has at least one water drainage bore formed therein.

11. A cable saver mechanism according to claim 10, wherein said water drainage bore is formed in said first end wall.

12. A cable saver mechanism according to claim 1, wherein said first and second tubular sections are telescopically coupled together with one of said first and second tubular sections having at least one slot and the other of said first and second tubular sections having at least one projection located within said slot.

13. A cable saver mechanism comprising:
    a first housing portion having a first tubular section with a first end wall and first open end spaced from said first end wall, said first end wall including a first cable bore with an internal section becoming wider towards said first open end;
    a second housing portion having a second tubular section with a second end wall and second open end spaced from said second end wall, said second end wall including a second cable bore, said first and second open ends of said first and second housing portions being movably coupled together; and a biasing member disposed between said first and second end walls to urge said first and second housing portions apart from each other, said external section of said first cable bore having a first end adjacent said internal section and a second end remote from said internal section with said external section having a first width becoming wider from said first end of said external section to said second end of said external section.

14. A cable saver mechanism according to claim 13, wherein said external section has a second width that is perpendicular to said first width of said external section, said second width having a pair of substantially parallel surfaces that are spaced apart by a distance substantially equal to a first width of said internal section adjacent said first end wall.

15. A cable saver mechanism according to claim 13, wherein said outer mounting section includes a mounting hole extending substantially perpendicular to said first cable bore and located between said internal section and said external section.

16. A cable saver mechanism comprising:

a first housing portion having a first tubular section with a first end wall and first open end spaced from said first end wall, said first end wall including a first cable bore with an internal section becoming wider towards said first open end;

a second housing portion having a second tubular section with a second end wall and second open end spaced from said second end wall, said second end wall including a second cable bore, said first and second open ends of said first and second housing portions being movably coupled together; and a biasing member disposed between said first and second end walls to urge said first and second housing portions apart from each other, said first and second tubular sections being telescopically coupled together with one of said first and second tubular sections having at least one slot and the other of said first and second tubular sections having at least one projection located within said slot, said slot being covered by a sleeve coaxially mounted on said one of said first and second tubular sections with said slot.

17. A cable saver mechanism according to claim 16, wherein an external surface of said other of said first and second tubular sections with said projection has a recessed surface to accommodate inward deflection of a portion of said one of said first and second tubular sections with said slot.

18. A cable saver mechanism comprising:

a first housing portion having a first tubular section with a first end wall and first open end spaced from said first end wall, said first end wall including a first cable bore, said first housing portion includes at least one water drainage bore in said first end wall;

a section housing portion having a second tubular section with a second end wall and second open end spaced from said second end wall, said second end wall including a second cable bore, said first and second open ends of said first and second housing portions being movably coupled together by a coupling arrangement that allows limited axial movement of said first and second housing portions relative to each other and prevents axial separation of said first and second housing portions;

a biasing member disposed between said first and second end walls to urge said first and second housing portions apart from each other; and a sleeve coaxially mounted to said first and second tubular sections and arranged to prevent separation of said coupling arrangement.

19. A cable saver mechanism according to claim 18, wherein said water drainage bore is formed in said first end wall.

20. A cable saver mechanism according to claim 18, wherein said first cable bore has an internal section that becomes wider towards said first open end.

21. A cable saver mechanism according to claim 20, wherein said first end wall includes an inner abutment surface and an inner annular wall section extending from said inner abutment surface towards said first open end.

22. A cable saver mechanism according to claim 21, wherein said inner annular wall section is concentrically arranged within said first tubular section with said inner abutment surface extending radially therebetween.

23. A cable saver mechanism according to claim 22, wherein said biasing member is a coil spring located concentrically around said inner annular wall section.

24. A cable saver mechanism according to claim 20, wherein said first end wall has an outer mounting section forming a portion of said first cable bore.

25. A cable saver mechanism according to claim 24, wherein said outer mounting section includes a mounting hole extending substantially perpendicular to said first cable bore.

26. A cable saver mechanism according to claim 24, wherein said outer mounting section forms an external section of said first cable bore that is substantially axial aligned with said internal section of said first cable bore.

27. A cable saver mechanism according to claim 20, further comprising a cable adjusting mechanism coupled to said second housing portion.

28. A cable saver mechanism according to claim 27, wherein said second housing portion has a recess that receives a portion of said cable adjusting mechanism therein.

29. A cable saver mechanism according to claim 28, wherein an external surface of said other of said first and second tubular sections with said projection has a recessed surface to accommodate inward deflection of a portion of said one of said first and second tubular sections with said slot.

30. A cable saver mechanism according to claim 20, wherein said first and second tubular sections are telescopically coupled together with one of said first and second tubular sections having at least one slot and the other of said first and second tubular sections having at least one projection located within said slot.

31. A cable saver mechanism according to claim 20, wherein said internal section of said first cable bore has a first width adjacent said first end wall and a second width adjacent said first open end, said second width being at least twice said first width.

32. A cable saver mechanism comprising a first housing portion having a first tubular section with a first end wall and first open end spaced from said first end wall, said first end wall including a first cable bore, said first housing portion includes at least one water drainage bore;

a second housing portion having a second tubular section with a second end wall and second open end spaced from said second end wall, said second end wall including a second cable bore, said first and second open ends of said first and second housing portions being movably coupled together; and a biasing member disposed between said first and second end walls to urge said first and second housing portions apart from each other, said external section of said first cable bore having a first end adjacent said internal section and a second end remote from said internal section with said external section having a first width becoming wider from said first end of said external section to said second end of said external section.

33. A cable saver mechanism according to claim 32, wherein said external section has a second width that is perpendicular to said first width of said external section, said second width having a pair of substantially parallel surfaces that are spaced apart by a distance substantially equal to a first width of said internal section adjacent said first end wall.

34. A cable saver mechanism according to claim 32, wherein said outer mounting section includes a mounting hole extending substantially perpendicular to said first cable bore and located between said internal section and said external section.

35. A cable saver mechanism comprising:

a first housing portion having a first tubular section with a first end wall and first open end spaced from said first end wall, said first end wall including a first cable bore with an internal section becoming wider towards said first open end;

a second housing portion having a second tubular section with a second end wall and second open end spaced from said second end wall, said second end wall including a second cable bore, said first and second open ends of said first and second housing portions being movably coupled together;

a biasing member disposed between said first and second end walls to urge said first and second housing portions apart from each other; and a cable adjusting mechanism coupled to said second housing portion, said cable adjusting mechanism having a first mating surface and said second housing portion has a second mating surface with said first and second mating surfaces being urged together by a biasing element, one of said first and second mating surfaces having a detent and the other of said first and second mating surfaces having a recess configured to cooperate with said detent to prevent relative rotational movement between said cable adjusting mechanism and said second housing portion until a rotational force is applied therebetween that overrides a force from said biasing element to cause relative axial movement between said cable adjusting mechanism and said second housing portion.

36. A cable saver mechanism comprising a first housing portion having a first tubular section with a first end wall and first open end spaced from said first end wall, said first end wall including a first cable bore having an internal section that becomes wider towards said first open end, said first housing portion includes at least one water drainage bore;

a second housing portion having a second tubular section with a second end wall and second open end spaced from said second end wall, said second end wall including a second cable bore, said first and second open ends of said first and second housing portions being movably coupled together; and a biasing member disposed between said first and second end walls to urge said first and second housing portions apart from each other, a cable adjusting mechanism coupled to said second housing portion, said cable adjusting mechanism having a first mating surface and said second housing portion has a second mating surface with said first and second mating surfaces being urged together by a biasing element, one of said first and second mating surfaces having a detent and the other of said first and second mating surfaces having a recess configured to cooperate with said detent to prevent relative rotational movement between said cable adjusting mechanism and said second housing portion until a rotational force is applied therebetween that overrides a force from said biasing element to cause relative axial movement between said cable adjusting mechanism and said second housing portion.

37. A cable saver mechanism comprising a first housing portion having a first tubular section with a first end wall and first open end spaced from said first end wall, said first end wall including a first cable bore having an internal section that becomes wider towards said first open end, said first housing portion includes at least one water drainage bore;

a second housing portion having a second tubular section with a second end wall and second open end spaced from said second end wall, said second end wall including a second cable bore, said first and second open ends of said first and second housing portions being movably coupled together; and a biasing member disposed between said first and second end walls to urge said first and second housing portions apart from each other, said first and second tubular sections being telescopically coupled together with one of said first and second tubular sections having at least one slot and the other of said first and second tubular sections having at least one projection located within said slot, said slot being covered by a sleeve coaxially mounted on said one of said first and second tubular sections with said slot.

38. A cable saver mechanism comprising:

a first housing portion having a first tubular section with a first end wall and first open end spaced from said first end wall, said first end wall including a first cable bore with an internal section becoming wider towards said first open end;

a second housing portion having a second tubular section with a second end wall and second open end spaced from said second end wall, said second end wall including a second cable bore, said first and second open ends of said first and second housing portions being movably coupled together by a coupling arrangement that allows limited axial movement of said first and second housing portions relative to each other and prevents axial seperation of said first and second housing portions;

a biasing member disposed between said first and second end walls to urge said first and second housing portions apart from each other; and a sleeve coaxially mounted to said first and second tublar sections and arranged to prevent seperation of said coupling arrangement.

39. A cable saver mechanism comprising:

a first housing portion having a first tubular section with a first end wall and first open end spaced from said first end wall, said first end wall including a first cable bore with an internal section becoming wider towards said first open end;

a second housing portion having a second tubular section with a second end wall and second open end spaced from said second end wall, said second end wall including a second cable bore with a longitudinal axis, said first and second open ends of said first and second housing portions being movably coupled together to move between an extended position and a retracted position; and a biasing member disposed between said first and second end walls to urge said first and second housing portions apart from each other toward said extended position such that said first and second housing portions move freely toward said retracted position upon application of a force larger than an urging force of said biasing member on at least one of said first and second housing portions.

* * * * *